United States Patent [19]
Hansen et al.

[11] Patent Number: 5,909,703
[45] Date of Patent: Jun. 1, 1999

[54] METHOD AND APPARATUS FOR BANKING ADDRESSES FOR DRAMS

[75] Inventors: John P. Hansen; Robert Paul Gittinger; Ronald W. Stence, all of Austin, Tex.

[73] Assignee: Advanced Micro Devices, Inc., Sunnyvale, Calif.

[21] Appl. No.: 08/813,727

[22] Filed: Mar. 7, 1997

[51] Int. Cl.⁶ .................................................. G06F 12/00
[52] U.S. Cl. ............................ 711/211; 711/167; 711/106
[58] Field of Search ....................... 365/230.03; 711/106, 711/167, 211

[56] References Cited

U.S. PATENT DOCUMENTS

| 5,265,231 | 11/1993 | Nuwayser | 711/106 |
| 5,535,169 | 7/1996 | Endo et al. | 365/230.03 |
| 5,623,638 | 4/1997 | Audrade | 711/167 |

OTHER PUBLICATIONS

Advanced Micro Devices, Inc., "Breaking Through the 1 MByte Address Barrier Using the Am186ES Microcontroller", Feb. 6, 1996–Mar. 7, 1996.

Advanced Micro Devices, "Am 186™EM and AM188™EM User's Manual with Am186 Instruction Definitions", 1995, pp. 1–1 thru 1–6; 2–1 thru 2–9; 3–1 thru 3–18; 4–1 thru 4–9; 5–1 thru 5–12; 6–1 thru 6–2; 7–1 thru 7–35; and 12–1 thru 12–6.

Advanced Micro Devices, "Am186™EM and Am188™EM High –Performance, 80C186–and 80C188–Compatible, 16–Bit Embedded Microcontrollers", 1996, pp. 1–98.

Advanced Micro Devices, "Am186™ES and Am188™ES High–Performance, 80C186–and 80C188–Compatible, 16–Bit Embedded Microcontrollers", 1996, pp. 1–124.

*Primary Examiner*—Tod R. Swann
*Assistant Examiner*—Donald Laugjam
*Attorney, Agent, or Firm*—Zagorin, O'Brien & Graham, L.L.P.

[57] ABSTRACT

A first plurality of address bits is provided to an address bus during a first time period. At least one banking address bit or at least one non banking address bit is selected according to a banking control signal, the selected bit being part a second plurality of address bits. The second plurality of address bits is multiplexed onto the address bus during a second time period. A first selector circuit receives a first and second group of address bits for a memory and outputs the first and second group during a first and second time period, respectively, according to a first select signal. A second selector circuit provides a subset of the second group to the first selector circuit, the second selector circuit selects a banking address group or a non banking address group as the subset according to a memory banking enable signal.

26 Claims, 8 Drawing Sheets

METHOD AND APPARATUS FOR BANKING ADDRESSES FOR DRAMS

CROSS-REFERENCE TO RELATED APPLICATIONS

This application relates to the following co-pending application Ser. No. 08/813,728, filed Mar. 7, 1997 (Attorney Reference No: M-4636 U.S.), entitled "OVERLAPPING PERIPHERAL CHIP SELECT SPACE ON A MICROCONTROLLER WITH AN INTEGRATED DRAM CONTROLLER", by Gittinger et al.; Ser. No. 08/813,734 filed Mar. 7, 1997 (Attorney Reference No: M-4638 U.S.), entitled "A METHOD AND APPARATUS FOR ADDRESS MULTIPLEXING TO SUPPORT VARIABLE DRAM SIZES", by Hansen et al.; and Ser. No. 08/813,726 filed Mar. 7 1997 (Attorney Reference), entitled "INTEGRATING A DRAM CONTROLLER ONTO A MICROCONTROLLER", by Gittinger et. al., all of which were filed the same day as the present application and all of which are incorporated herein by reference.

BACKGROUND OF THE INVENTION

1. Field of the Invention

This invention relates to computers and more particularly to addressing of computer memories.

2. Description of the Related Art

Many computer system architectures have inherent limits on the size of memory available to the system. For example, in '186 processors, i.e., processors compatible with the 80186 processor, the address range is limited to 1 Mbyte. The Motorola HS68000 processor is limited to 16 Mbytes. In order to extend the address range beyond those limitations, address banking provides one solution for interfacing with devices such as SRAM, Flash memory, and ROM, which do not have multiplexed address buses. For such memory devices, banking schemes utilize one or more address bits which are set external to the processor's normal addressing calculation. One way to provide these extra address bits would be to use the programmable input/output (PIOs) of the AM186™ES. Because these bits are programmable, they can be written to the appropriate value to provide entry to or exit from a memory bank.

One example of a banking technique for use with devices with non-multiplexed addresses, is shown in FIG. 1. AM186™ES processor 107, with an address range of 1 Mbyte, could utilize PIO bits 20–23 to expand the 1 Mbyte address range of the '186 to 2.5 Mbytes.

In more detail, in the exemplary system shown in FIG. 1, the upper memory chip select (UCS), is mapped to the upper 256 Kbytes of the 1 Mbyte address space and provides access to the flash memory 101 (which may be, e.g., AM29F010 flash memory) containing 256 Kbytes (128K× 8)×2). The lower memory chip select (LCS), is mapped to the lower 256 Kbytes, and provides access to memory 103. The middle chip select (MCS0) is mapped to 256 Kbytes of address space and is used to address flash memory 105. Thus, memory banking is provided in the address space of block 203. The PIO bits are used to select one of 16 independent Flash segments of 256 Kbytes each in flash memory 105. Thus, the system in FIG. 1 provides a total of 2.5 Mbytes of address space and provides expanded memory capability without any glue logic, i.e., logic between the processor and the memory providing e.g., address decoding.

However, the above scheme will not work for Dynamic Random Access Memories (DRAMs) because DRAMS require multiplexing the address into row and column addresses. That is, DRAMs require that the address be split into rows and columns with the row address being provided to the DRAM during a first time period (row access strobe (RAS) cycle) and the column addresses being provided to the DRAM during a second time period (column access strobe (CAS) cycle). Multiplexing the row and column addresses reduces the number of address pins required on a DRAM and enables, e.g., a twenty bit address to be provided to a DRAM with only 10 address pins. However, it makes the banking schemes previously discussed unsuitable because of the need to incorporate the banked address into the multiplexed address. It would be desirable to provide expanded memory capability for DRAMs where multiplexed addresses are required. Further, it would be desirable to provide a glueless (no peripheral logic required) interface that provides DRAM banking capability. Thus, it would be desirable to find a way to multiplex in extra address bits to provide banking capability for DRAMs, i.e., increased address capability.

SUMMARY OF THE INVENTION

Accordingly, the invention provides a method of operating a processor to provide a mutliplexed address for a DRAM. A first plurality of address bits is provided to an address bus during a first time period. Either at least one banking address bit or at least one non banking address bit is selected according to a banking control signal, the selected bit being part a second plurality of address bits. The second plurality of address bits is multiplexed onto the address bus during a second time period. The invention also provides apparatus in which a first selector circuit receives a first and second group of address bits for a memory and outputs the first and second group during a first and second time period, respectively, according to a first select signal. A second selector circuit provides a subset of the second group to the first selector circuit, the second selector circuit selects a banking address group or a non banking address group as the subset according to a memory banking enable signal.

One important advantage of the present invention is that no glue logic is necessary when the present invention is utilized. Thus, a design can be implemented in a more cost efficient manner, as there are fewer parts and less design and debug time. Additionally, the design can be faster since glue logic tends to slow down operating speeds.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 1:
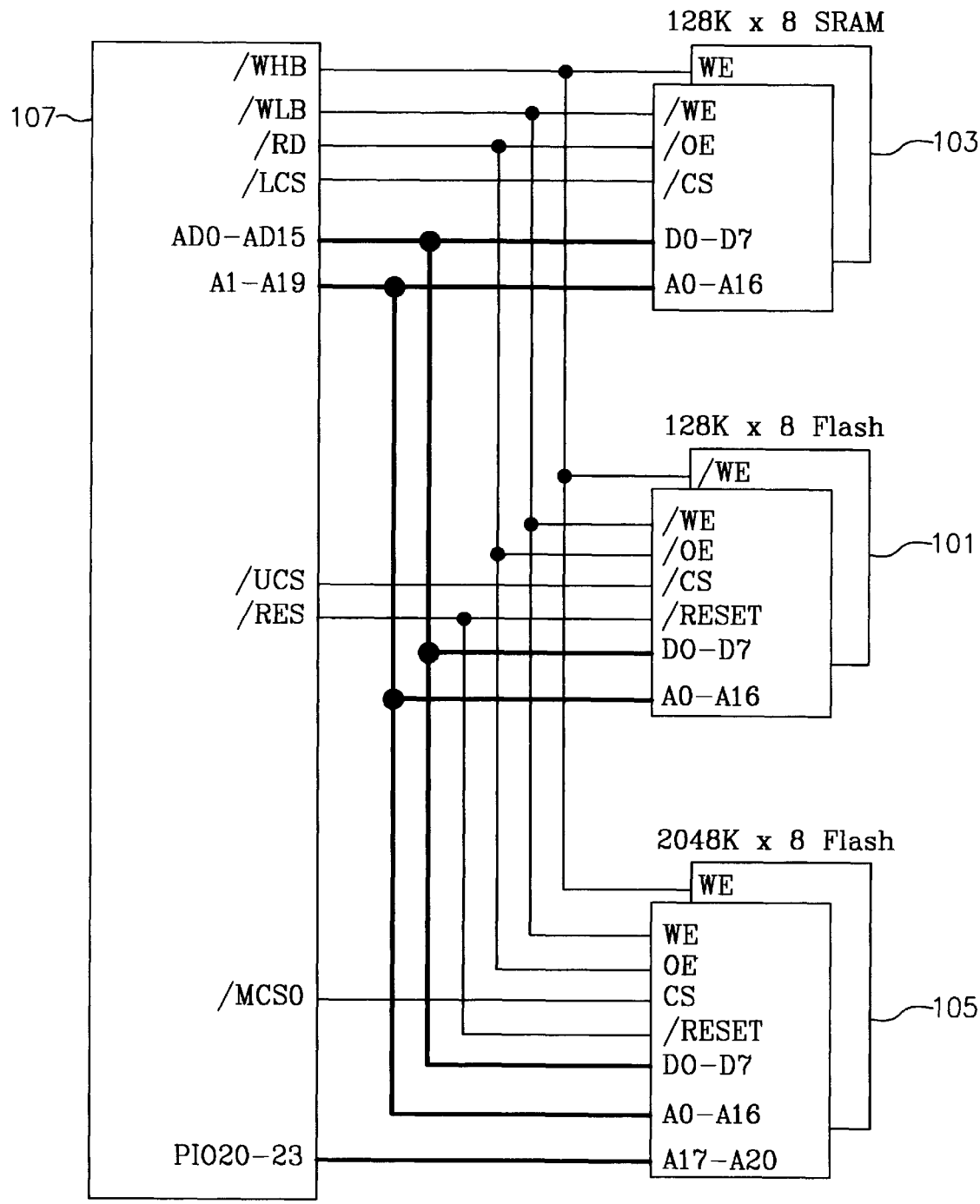
FIG. 1 shows a prior art banking scheme for non-DRAM memory devices.
Figure 2:
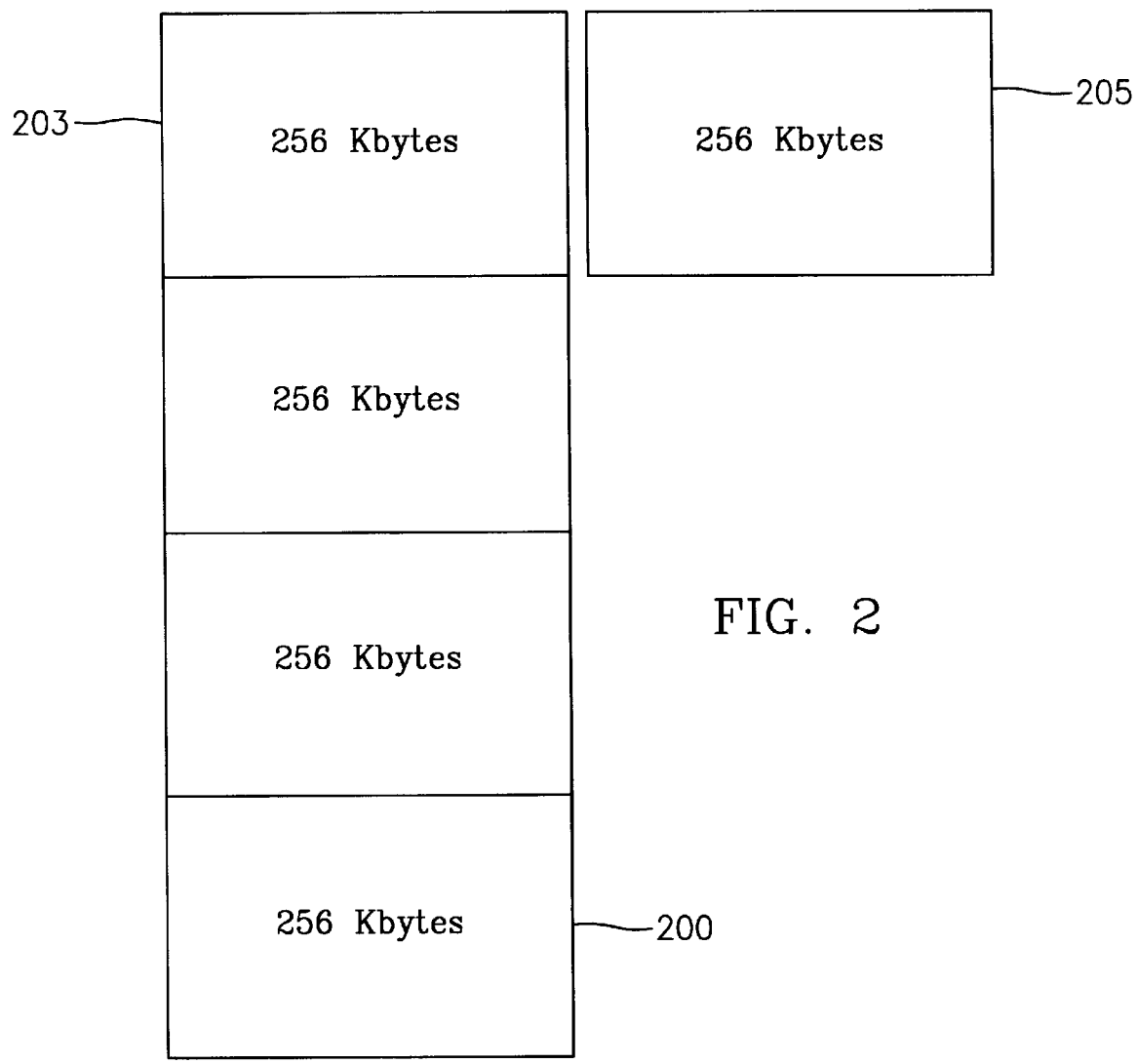
FIG. 2 shows conceptually a banking scheme.

Memory banking for DRAMs is shown conceptually in FIG. 2. Assume that the computer system provides one Mbyte of addressing capability as does, e.g., the AM186 processor. The memory of such a computer system is shown in FIG. 2 as memory 200 which in the example is divided into four separate 256 Kbyte sections. In order to go beyond the 1 Mbyte range, banking capability allows memory 205 to be accessed in the same address space as memory 203. The other blocks of memory see an access to memory 205 as an access to memory 203 while blocks 203 and 205 distinguish appropriately. Thus, the memory capability has been increased in the example of FIG. 2 by 256 Kbytes.

Figure 3:
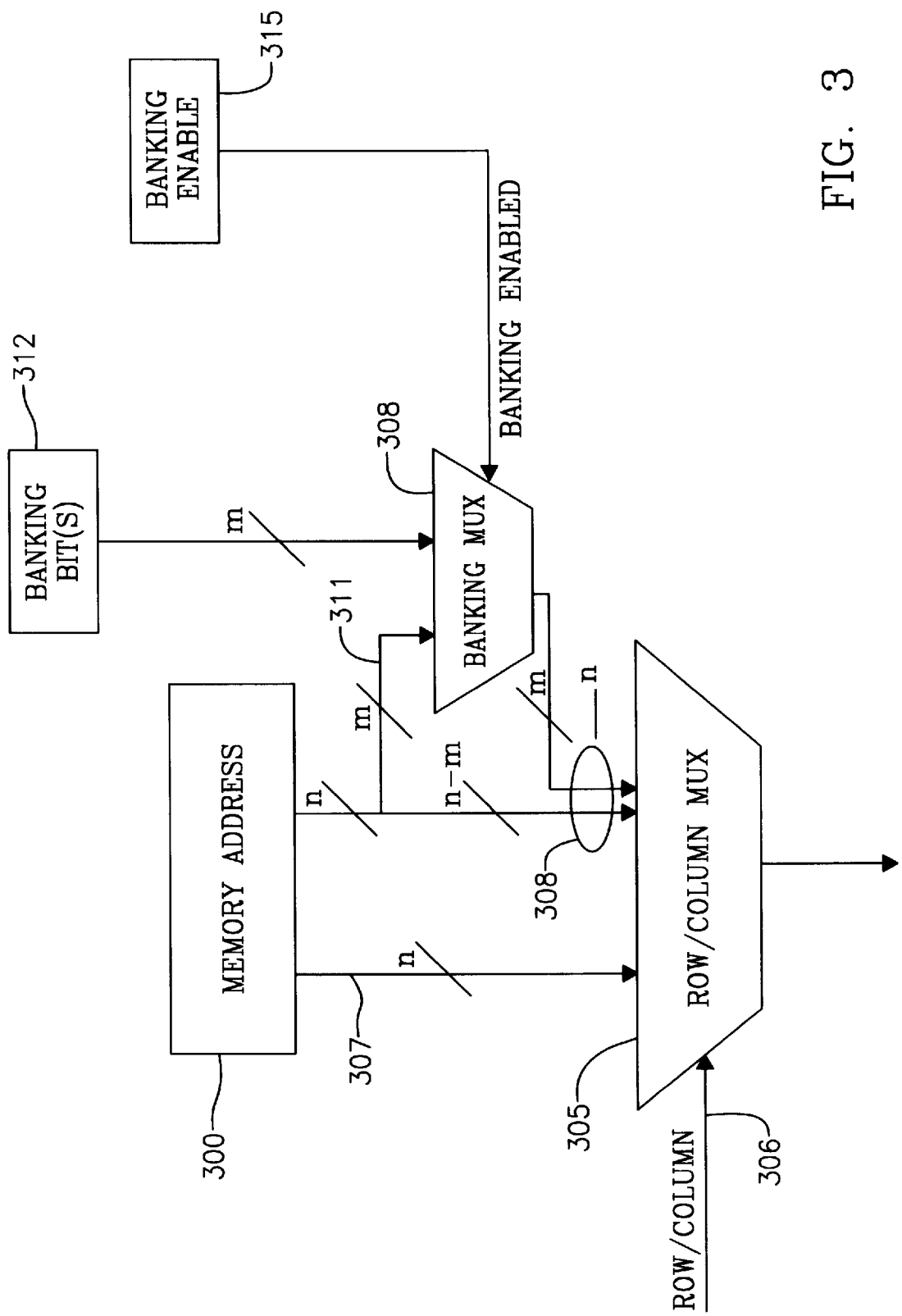
FIG. 3 shows an addressing circuit according to one embodiment of the present invention.

In order to implement such a banking scheme for DRAM, it is necessary to multiplex in the extra address bits onto the address bus which is already multiplexed for rows and columns. One embodiment of such an address circuit is shown in FIG. 3. The memory address normally determined (i.e. without banking enabled) is contained in 300 which may be a register or may be the output of combinational logic or may be a combination of both. Multiplexer 305 selects either the row address 307 or the column address 308 according to the value of the row/column control signal 306. During the RAS cycle, the row address will be output and during the CAS cycle the column address will be output according to conventional DRAM requirements.

In order to provide banking capability, certain of the column address bits are provided from banking multiplexer 308 rather than directly from memory address 300. In the example shown, m bits of the column address are provided by multiplexer 308 which selects either the normal address bits 311 or banking bits 312. Note that m can be one or more bits.

Banking is enabled by writing programmable banking enable register 315. When enabled, the banking multiplexer 308 selects the m banking bits from banking bit register 312. Banking bit register 312 may also be a programmable register. That is, software can write the register to set the bit values to select the appropriate bank. The banking bit(s) can come from a programmable input/output (PIO) register. In that embodiment, register 312 is the PIO register. In other embodiments, other ways may be utilized to provide the banking bit(s) which are provided to multiplexer 308. For instance, the value of the banking bits 312 may be determined from an extension to a DMA address register. Thus, the DMA address register is written with the value of the banking bit(s) which are then supplied on the muliplexed address pins when banking is enabled.

Instead of having PIO bit(s) or DMA bit(s) which must be written to change banks, internal status bits could also be used to provide the value of the banking bit(s). For example, when a data read/write is occurring, the banking bit could be set with a first value, e.g., a 1. When an instruction fetch was occurring, the banking bit could be forced to 0. Thus one bank would be selected during an instruction operation and another bank during a data operation. In the AM186™ES, the status signals $\overline{S2},\overline{S1}$ and $\overline{S0}$ which indicate to the system the type of bus cycle in progress, e.g., read data from memory, write data to memory and instruction fetch, among others, can be used as the internal status bits to determine the value of the banking bit(s).

Figure 4:
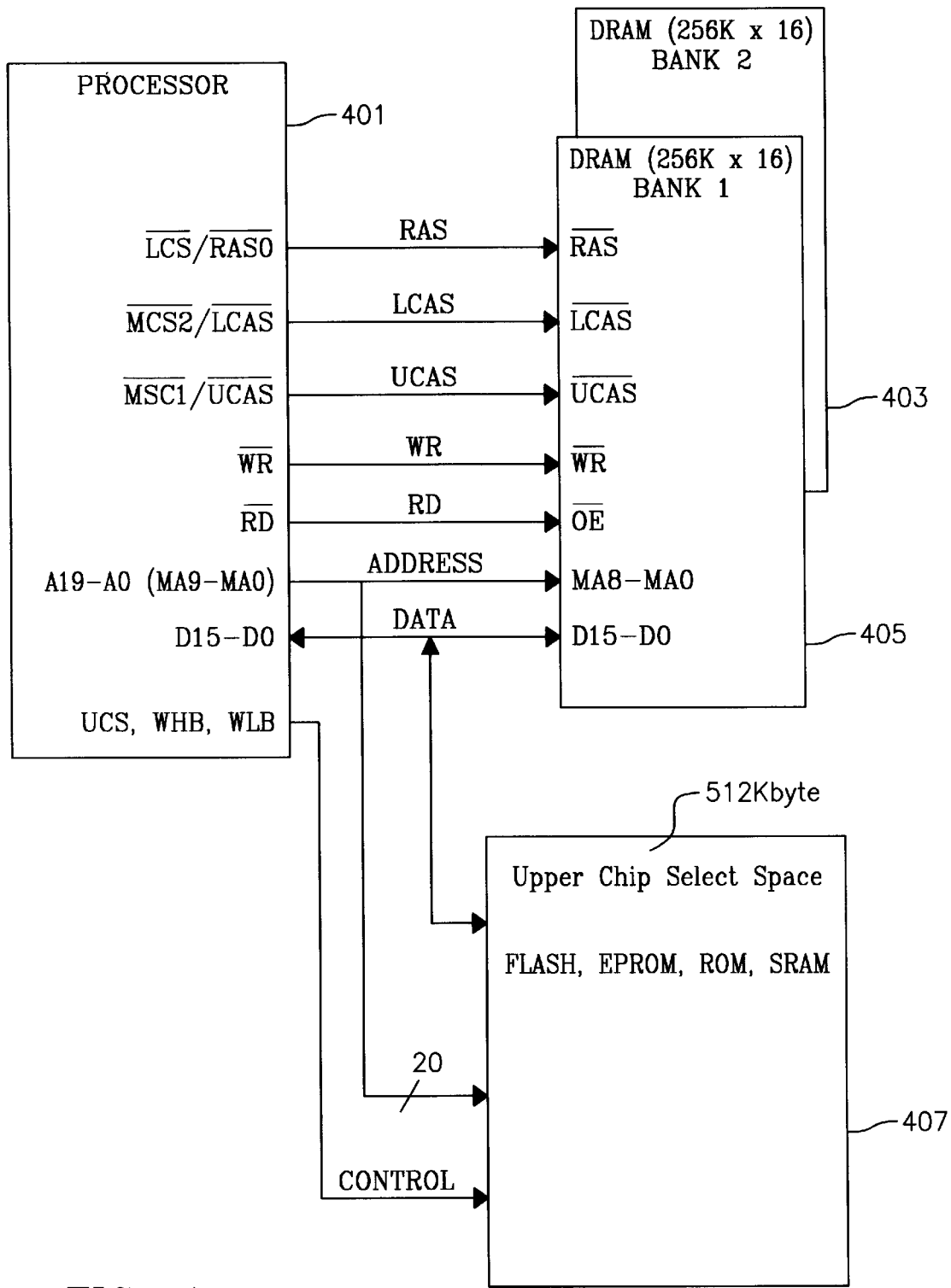
FIG. 4 shows a system according to the present invention.

In the examples discussed herein, it is assumed that the processor being utilized is a '186 compatible microcontroller with 1 Mbyte of memory addressing capability. The details of a '186 microcontroller can be found in the Advanced Micro Devices data sheet for the AM186™ES (Publication #20002; Rev. A; Amendment/0; Issue Date: January 1996), which is incorporated herein by reference. It is also assumed that such a system includes DRAM capability, i.e., the capability to provide the appropriate control signals to interface with DRAM. Such a system is shown in FIG. 4 in which processor 401 is coupled to memories 403, 405 and 407. Under a normal system configuration, memories 405 and 407 which are each 512 Kbytes (1 Mbyte total) are the maximum memory area addressable. However, when the lower 512K address space is configured as DRAM space, the Lower Memory Chip Select (LCS) signal, which is active during an access to addresses within the lower 512 Kbytes of memory, is converted into RAS signal. See co-pending applications incorporated by reference, mentioned previously, for additional details for supporting DRAM.

In the AM186™ES, the LCS can be mapped into block sizes of 64K, 128K, 256K or 512K. That is, LCS will be asserted when an access occurs into the designated block. In the example shown in FIG. 4, the LCS block size is selected at 512K. The Midrange Memory Chip Selects ($\overline{MCS2}$ and $\overline{MCS1}$) provide respectively $\overline{LCAS}$ and $\overline{UCAS}$ which assert for a low byte and word access and a high byte and word access, respectively.

In one preferred embodiment, the odd address pins of processor 401 are coupled to DRAM 403 and 405 as shown in Table 1. As can be seen, every odd pin is connected to the DRAM. During a RAS cycle, the odd address values are provided to the DRAM. During a CAS cycle, the even pins are multiplexed onto the odd pins to provide the column address. Note that A0 is not provided to the DRAMs in the example shown. That is due to the provision of low byte and high byte column strobes ($\overline{LCAS}$ and $\overline{UCAS}$).

TABLE 1

| 186 Addr/DRAM Addr | Row Address | Column Address |
| --- | --- | --- |
| A1/A0 | A1 | A2 |
| A3/A1 | A3 | A4 |
| A5/A2 | A5 | A6 |
| A7/A3 | A7 | A8 |
| A9/A4 | A9 | A10 |
| A11/A5 | A11 | A12 |
| A13/A6 | A13 | A14 |
| A15/A7 | A15 | A16 |
| A16/A8 | A17 | A18 |
| A19/A9 | A19 | A19 |

The upper 512 Kbytes 407 in FIG. 4 can be utilized by memories such as Flash, EPROM, ROM, SRAM which do not require a multiplexed address bus. In the lower address range, a second bank of DRAM 403 is also accessible. One embodiment of the banking scheme that provides a 512 Kbyte bank in the lower address range works as follows in a '186 chip configured to support DRAM. Assume the banking bit is provided from a programmable PIO register. Referring again to FIG. 3, when banking is enabled by asserting programmable register 315, the PIO bit, which is writable by software, is supplied through multiplexer 308 to multiplexer 305. Referring back to FIG. 4, the multiplexed address (MA9–MA0) is provided to DRAMs 405 and 403 which are also identified as Bank1 and Bank2, respectively.

Figure 5:
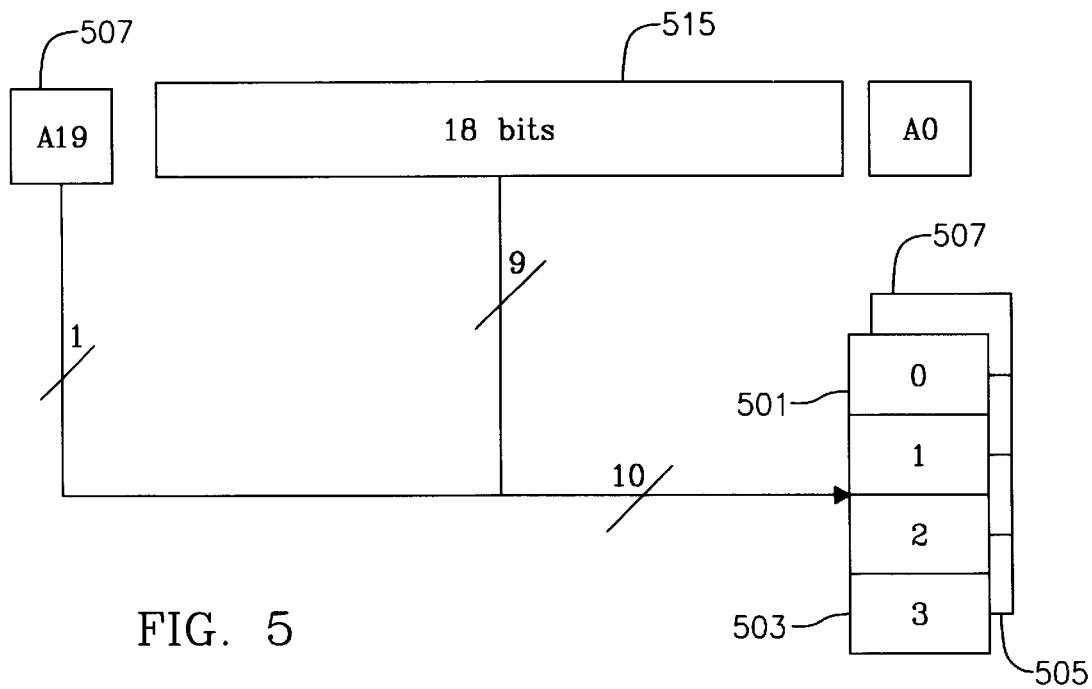
FIG. 5 shows address utilization according to one embodiment of the invention.

Rather than being two separate memories, Bank1 and Bank2 are preferably part of a 1 Mbyte DRAM. That is shown more clearly in FIG. 5 where Bank1 and Bank2 are part of 1 Mbyte memory 505. Note that memory 507 represents the memory containing the high (or low) bytes and is accessed according to $\overline{UCAS}$ (or $\overline{LCAS}$). As seen in FIG. 5, the twenty bit address (A19–A0) is divided into three areas, including area 515 containing 18 bits. Those 18 bits provide a 256 Kbyte addressing capability. As already mentioned, the information in the Least Significant Byte (LSB) A0 is contained in the upper and lower byte column strobes and thus 256K words (512 Kbytes) rather than bytes are actually accessible using the 19 bits (18 bits and A0).

From Table 1, it is seen that in this embodiment, A19 is provided on both the column address and the row address. Thus, 18 bits are multiplexed onto the address bus from area 515 and A19 is multiplexed twice onto the address bus. The one bit 507 constitutes the banking bit in this embodiment and can be provided by a PIO register or may be provided by the other methods discussed previously. Because the 1 bit from 507 is supplied on both the row and column address, the accessible address space is half of the available 1 Mbyte DRAM. Thus, when banking is not enabled, since A19 is 0 when the lower address space is selected, block 501 (block 0) is always selected. If banking is enabled, then A19 will be used to select block either block 501 or 503 (block 0 or block 3) which provides an additional addressing capability of 512 Kbytes. Although blocks 0 and 3 are shown as contiguous in FIG. 5, because of the odd/even addressing shown in Table 1, assumed for the present example, the addresses in the blocks may in fact not be contiguous. However, more conventional DRAM address schemes are possible where sequential addresses are supplied as the row and column addresses, and the memory blocks may in that case be contiguous.

The determination whether to assert RAS and CAS signals is based on the address, e.g., when the lower address space is accessed. Therefore, the location of memory access should be determined before any banking bits are multiplexed into the address.

Figure 6:
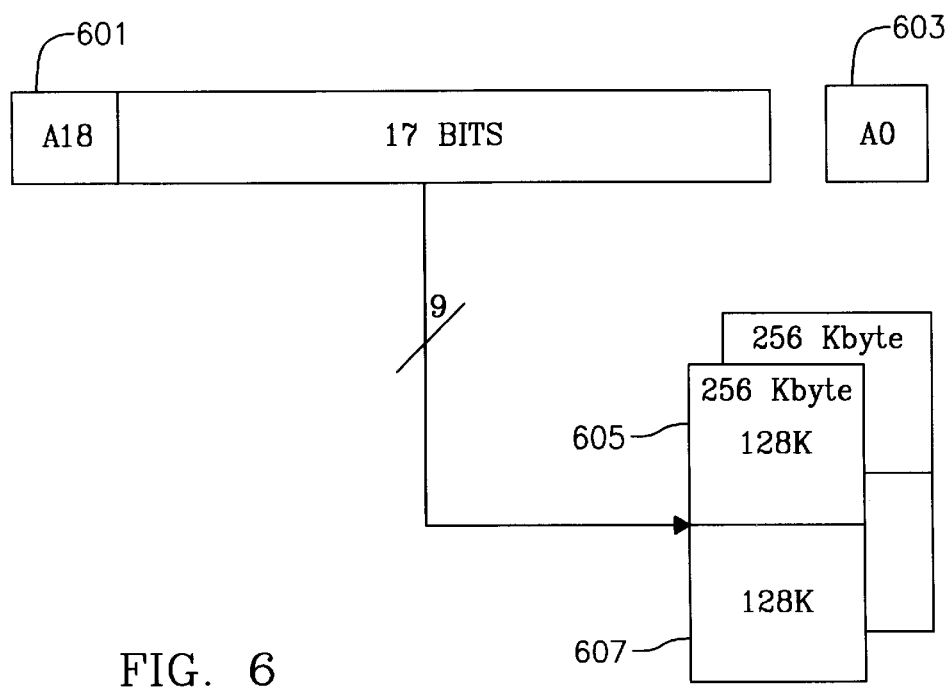
FIG. 6 shows address utilization according to another embodiment of the present invention.

A second example of banking is provided in FIG. 6, where 256 Kbytes of additional memory is provided. In this example, it is assumed that DRAM is mapped into 256 Kbytes of the lower address space, i.e. addresses between 0 and 3FFFFh. Thus, RAS, LCAS and UCAS will only be asserted when an address is between 0 and 3FFFFh. Assume that A18 is selected as the address bit which is replaced by a designated PIO bit during banking mode. The banking scheme then works as follows. The LSB 603 is still encoded in high byte and low byte column strobes so is not supplied to the memory. Address bits A18–A1 are supplied to the memory on 9 multiplexed address pins. When banking is not enabled, the address selects memory block 605. Note that because of odd/even addressing shown in the embodiment discussed herein, the blocks 605 and 607 may not be contiguous. It is entirely possible and within the scope of the invention to provide A18–A10 as the row addresses and A9–A1 as column addresses which may be a more conventional DRAM addressing scheme. In that case the blocks will be contiguous. In either case, when memory banking is enabled and the PIO bit is written as 1, then block 607 is selected. The DRAMs in this case can be a 256 Kbyte DRAM (one 256 Kbyte DRAM is required for the high byte and one for the low byte). All address space is utilized in this example unlike the example shown in FIG. 5. When the software wishes to access bank 605 again, it simply rewrites the PIO bit with a 0.

Figure 7:
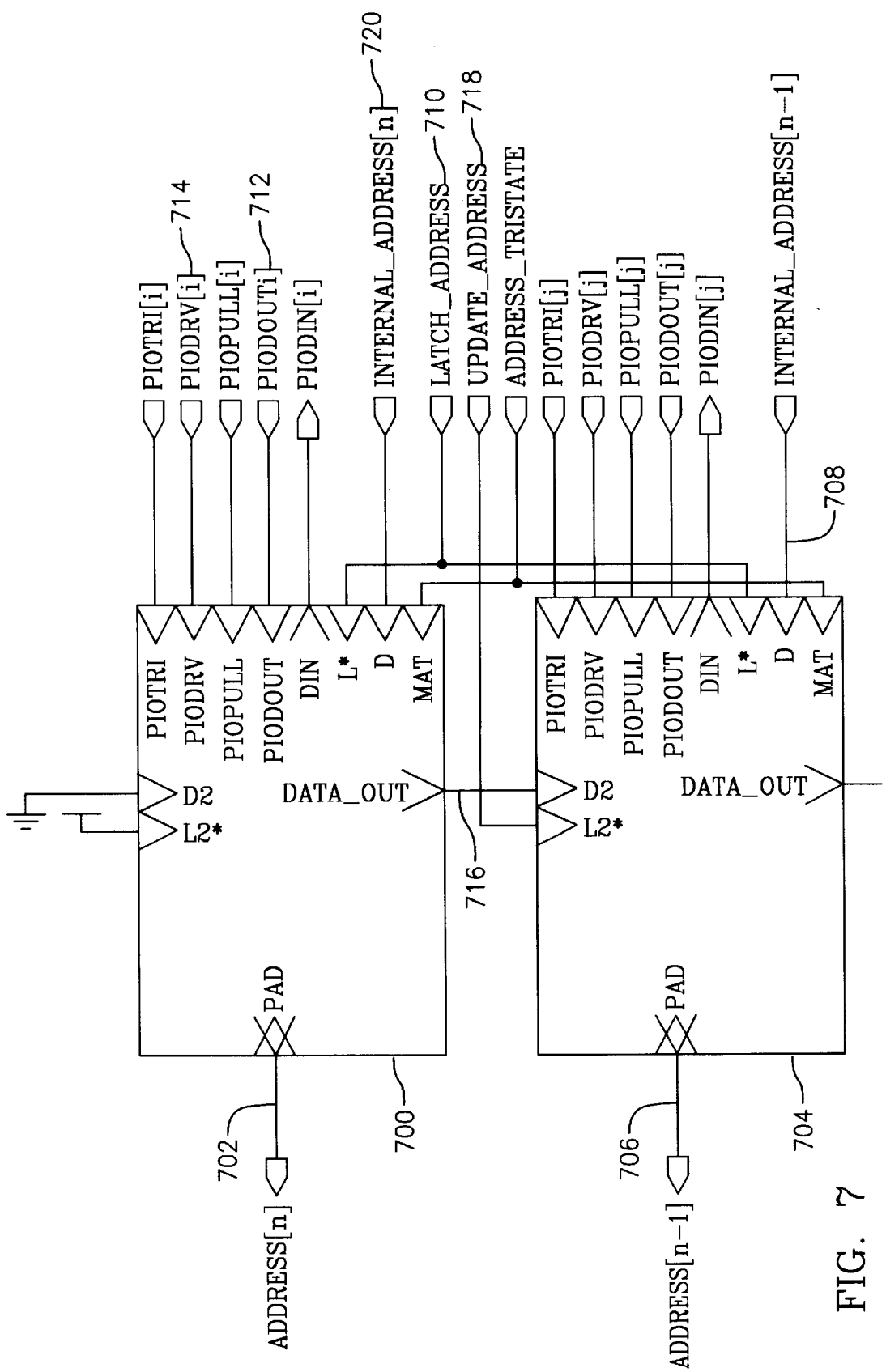
FIG. 7 shows a block diagram of an I/O circuit used in one embodiment of the invention.
Figure 8:
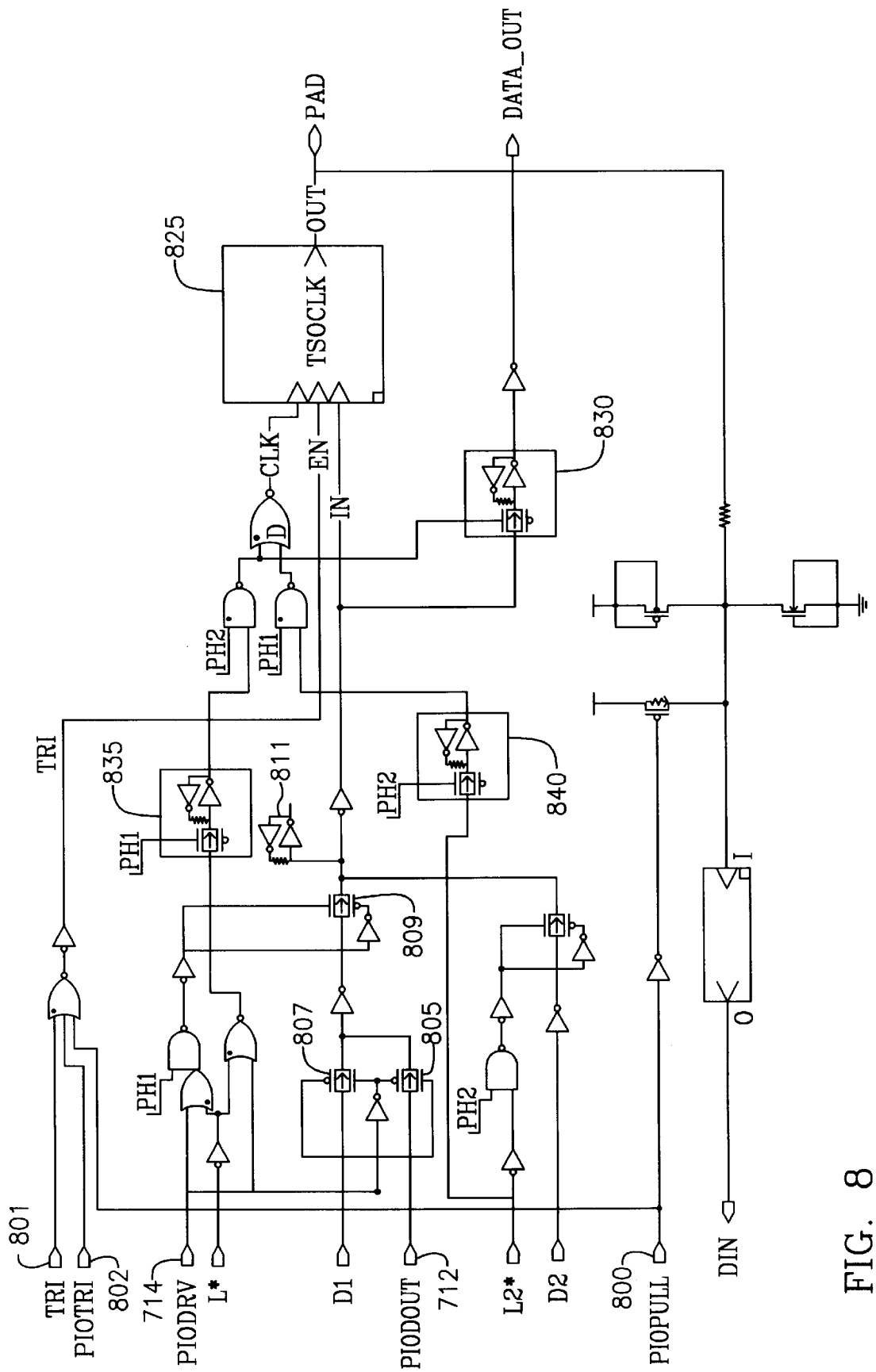
FIG. 8 shows further details of the I/O circuit in FIG. 7.
Figure 9:
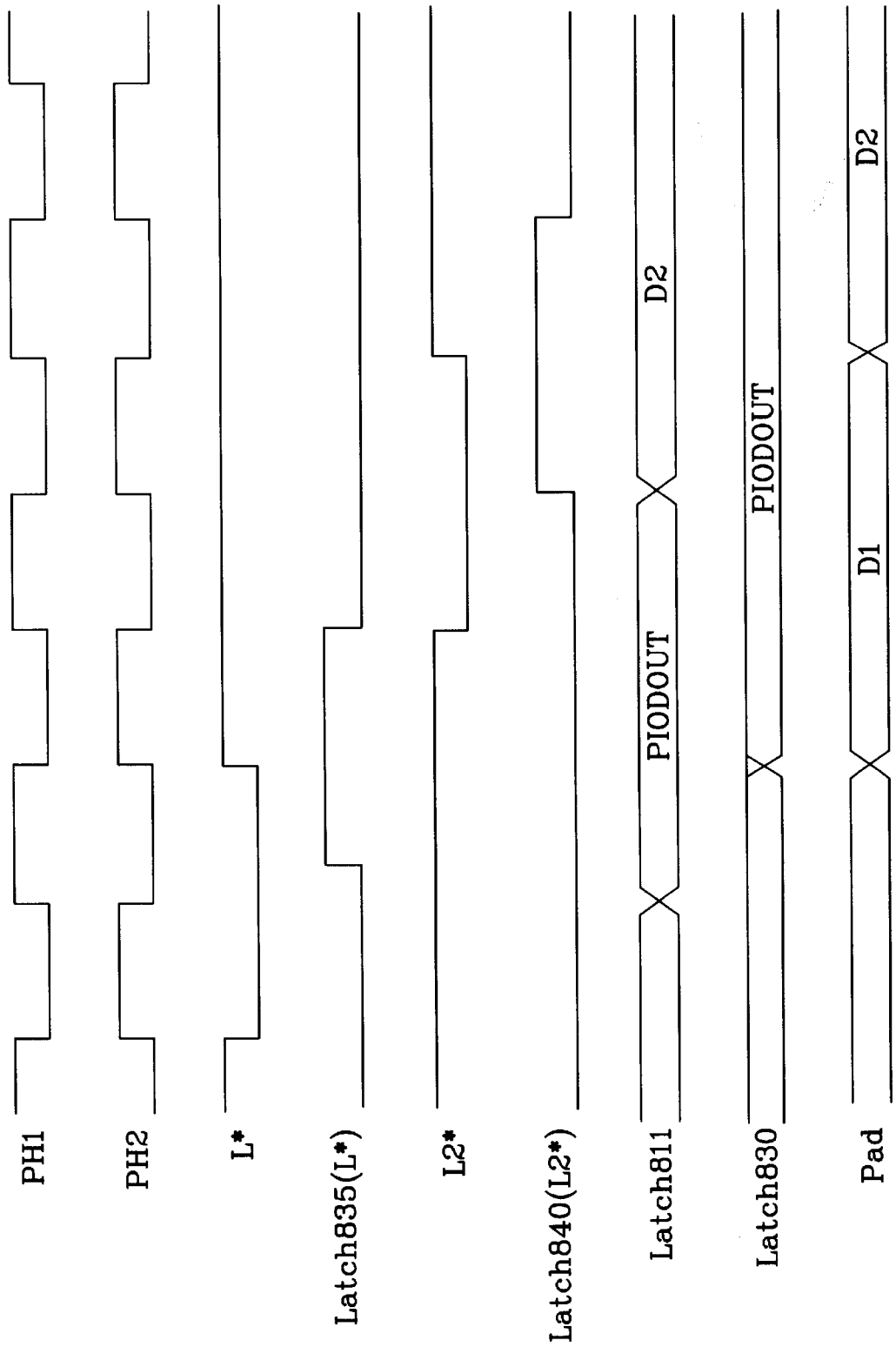
FIG. 9 shows a timing diagram of the circuit of FIG. 8.

While a multiplexing scheme to provide banking addresses for DRAMs is shown in FIG. 3, another embodiment of the invention is shown in FIG. 7 in which the selector circuits of FIG. 3 are distributed into input/output (I/O) circuits. Thus a group of output circuits actually forms the selector circuits shown at a high level in FIG. 3. Block 700 provides address bit 702 and block 704 provides address bit 706. Assume, for sake of discussion that address bit 702 is A18 and address bit 706 is A17 and the banking approach shown in FIG. 6 is being used. That is, bit 18 is being is being replaced by a PIO bit. Assume also that the odd pins are connected to the DRAM and the interleaving of Table 1 is being utilized. Thus, pin 706 is connected to the DRAM as the most significant address bit A8. During the first address cycle on the bus (RAS) internal address bit 708 is driven to the output pin 706. Latch address signal 710 (L*) serves as the strobe for the RAS cycle. Because pin 702 is not connected to the DRAM, driving a value during the RAS or CAS cycle has no effect on the DRAM. Referring to FIG. 4 momentarily, remember that address pin 702 is connected to other devices, e.g., memory devices in memory space 407. In order to drive A18 from a PIO register, block 700 needs to latch the PIODOUT value on 712 which comes from a register such as 312. Therefore PIODRV, which is asserted because the banking enable bit 315 is asserted, causes the PIO value in 315 to be latched into I/O block 700. The PIO value is provided to DATA OUT signal 716. In order to multiplex in the column address, Update Address signal 718 (L2*) serves as a strobe for the CAS cycle and latches the PIO data on 716 into block 706 as D2 data and drives that data on output 706. In that manner, the PIO data 712 is multiplexed onto the address bus for the DRAM. Note that when banking is not enabled, internal address 720, which is the non-banking value of A18, is output on the L2* cycle. I/O block 704 (which is the same as block 700) is shown in greater detail in FIG. 8. Signals 800, 801 and 802 cause the output 825 to be tristated. PIODRV 714 is sourced from, e.g., banking enable latch 315. That provides the multiplexing function between the banking address bit (from the PIO) and the non-banking address bit, performed in multiplexer 308. Thus, as previously sated, group of output circuits provides the multiplexers 308 and 306 of FIG. 3. PIODRV 714 allows PIODOUT 712 to be passed through transistor 805 and prevents D1 (e.g., internal address 720) from being passed in transistor 807. When L* is asserted (active low) the value on either D1 or PIODOUT will be provided to the output driver 825, depending on the value of PIODRV. The value is also labeled in latch 811. When PIODRV is asserted, latch 830 will latch in the value of PIODOUT. When L2* is asserted, the value on D2, which comes from DataOut of another I/O block, is provided to output driver 825 and driven off chip. A timing diagram showing the functioning of FIG. 8 in response to the input control signals and the clocks PH1 and PH2 is shown in FIG. 9. Note that it is assumed that PIODRV is asserted. If PIODRV were not asserted, the PIODOUT data shown would be D1 data.

While the embodiments shown herein have multiplexed in PIOs (or other bits) to replace column address bits, it is equally possible to substitute for row address bits. For the embodiments shown herein, it is advantageous to multiplex in the column address to maximize interfacing speed with other devices such as SRAM since the same address values for SRAM and DRAM can be driven during a RAS cycle, and the processor has until the CAS cycle to determine if the address space is mapped to DRAM.

Many other variations on the DRAM banking scheme disclosed herein are possible and are intended to be within the scope of the claimed invention. For instance, two PIO bits may be utilized for banking of DRAM in the upper address space (when A19=1) as shown in Table 2.

TABLE 2

| DRAM PIN | MA10 | MA9 | MA8 | MA7 | MA6 | MA5 | MA4 | MA3 | MA2 | MA1 | MA0 |
|---|---|---|---|---|---|---|---|---|---|---|---|
| PROC PIN | A19 | A18 | A17 | A16 | A15 | A14 | A13 | A12 | A11 | A10 | A9 |
| ROW ADDR | A19 | A18 | A17 | A16 | A15 | A14 | A13 | A12 | A11 | A10 | A9 |
| COL ADDR | PIO1 | PIO2 | A8 | A7 | A6 | A5 | A4 | A3 | A2 | A1 | A0 |

Instead of providing twenty bits of addressing from the twenty bits of addressing normally available (A19–A0), 22 bits could be provided. In such an embodiment for a processor which coupled the least significant address bit to memory, processor pins A19–A9 may be coupled to DRAM pins MA10 to MA0. During the RAS cycle, A19–A9 are driven on pins A19 to A9. During a CAS cycle, the two programmable bits (PIO 1 and PIO 2) could be multiplexed onto address pins A19 and A18 while address bits A8 through A0 are multiplexed onto address pins A17 through A9. Note the addressing capability will be reduced from 4 Mbytes (22 bits) to 2 Mbyte since A19 is always a one in the upper address space.

The description of the invention set forth herein is illustrative, and is not intended to limit the scope of the invention as set forth in the following claims. For instance, while the invention has been described specifically with a 186 implementation, the invention is also applicable to other processors which have limits on their addressing capability. Variations and modifications of the embodiments disclosed herein, may be made based on the description set forth herein, without departing from the scope and spirit of the invention as set forth in the following claims.

What is claimed is:

1. A method in a processor of providing a multiplexed address comprising the steps of:
   providing a first plurality of address bits to an address bus during a first time period;
   selecting one of at least one banking address bit and at least one non banking address bit according to a banking control signal, as part of a second plurality of address bits; and
   multiplexing the second plurality of address bits onto the address bus during a second time period, thereby providing the multiplexed address.

2. The method as recited in claim 1 further comprising the step of providing the multiplexed address to a DRAM.

3. The method as recited in claim 1 further comprising the step of writing a first internal register in the processor to programmably enable memory banking, the internal register providing the banking control signal.

4. The method as recited in claim 1 further comprising the step of writing a second internal register, the second internal register providing the at least one banking address bit.

5. The method as recited in claim 1 wherein the at least one banking address bit selects one of a first and second memory area.

6. A method of providing a DRAM address in a processor, comprising the steps of:
   providing a plurality of row address bits during a RAS cycle;
   providing a banking enable signial to an addressing circuit;
   selecting in the addressing circuit, as part of a plurality of column address bits, one of a predetermined number of non-banking column address bits and a predetermined number of banking column address bits according to the banking enable signal, the predetermined number of banking address bits selecting at least one of a first memory bank and a second memory bank; and
   providing the plurality of column address bits during a CAS cycle.

7. The method as recited in claim 6 further comprising the step of writing a register internal to the processor, to programmably select a value of the banking enable sigial.

8. The method as recited in claim 6 futher comprising the step of providing the predetermined number of banking column address bits from a programniable location internal to the processor.

9. The method as recited in claim 8 wherein the programmable location includes a programmable input/output bit.

10. The method as recited in claim 8 wherein the programmable location is part of a DMA address field.

11. The method as recited in claim 6 wherein a value of the predetermined nunmber of banking column address bits is determined according to internal status signals in the processor.

12. The method as recited in claim 11 wherein the internal status signals include an instruction fetch status signal, a write data status signal, and a read data status signal, the instruction fetch status signal causing the banking column address bit to be at a first value and the write data and the read data status signal causing the banking column address bit to be at a second value.

13. The method as recited in claim 6 wherein the predetermined number of banking address bits is one.

14. A processor comprising:
   a first selector circuit receiving a first and second group of address bits for a memory and outputting the first and second group during a first and second time period, respectively, according to a first select signal; and
   a second selector circuit for providing a subset of the second group to the first selector circuit, the second selector circuit providing one of a banking address group and a non banking address group as the subset according to a memory banking enable signal, the banking address group and the non banking address group each comprising at least one bit.

15. The processor as recited in claim 14 further comprising a programmable register providing the memory banking enable signal.

16. The processor as recited in claim 14 further comprising a programmable storage location coupled to the second selector circuit and providing the banking address group.

17. The processor as recited in claim 16 wherein the programmable storage location is comprised of at least one programmable input/output bit.

18. The processor as recited in claim 16 wherein the programmable storage location is an extension to a DMA address field.

19. The processor as recited in claim 14 wherein the banking address group is determined according to internal status signals in the processor.

20. The processor as recited in claim 19 wherein the internal status signals include an instruction fetch status signal, a write data status signal, and a read data status signal, the instruction fetch status signal causing the banking address group to be at a first value and the write data and the read data status signal causing the banking address bit group to be at a second value.

21. The processor as recited in claim 14 wherein the first selector circuit is comprised of a plurality of output circuits, each output circuit including a selector circuit to selector one bit of the first and second group according to the first select signal.

22. The processor as recited in claim 14 wherein the second selector circuit is comprised of at least one output circuit including a selector circuit to select one bit of the subset.

23. An apparatus comprising: a first output circuit including,
 a first selector circuit selecting one of a non banking address bit and a banking address bit according to a first control signal and providing a first selected address bit;
 an off chip driver coupled to an address bus; and
 a second selector circuit coupled to the off chip driver, selecting one of the first selected address bit and another address bit received from a second output circuit, according to a control signal indication.

24. The apparatus as recited in claim 23 wherein the second output circuit comprises:
 a third selector circuit selecting one of another non banking address bit and another banking address bit according to a second control signal and providing another selected address bit; and
 a latch, receiving the other selected address bit from the third selector circuit and providing the third selected address bit as the other address bit to the first output circuit.

25. The apparatus as recited in claim 23 wherein the control indication includes a row control signal indicating a row address and column control signal indicating a column address.

26. A computer system comprising:
 a memory coupled to receive multiplexed row and column addresses over a memory bus;
 a processor providing the multiplexed row and column addresses to the memory bus, the processor including,
 means for generating a banking control signal;
 means for providing a first plurality of address bits to the address bus during a first time period;
 means for selecting one of at least one banking address bit and at least one non banking address bit according to the banking control signal, as part of a second plurality of address bits; and
 means for supplying the second plurality of address bits onto the address bus during a second time period, thereby providing the multiplexed row and column addresses.

* * * * *

UNITED STATES PATENT AND TRADEMARK OFFICE
CERTIFICATE OF CORRECTION

PATENT NO. : 5,909,703
DATED : June 1, 1999
INVENTOR(S) : John P. Hansen, Robert Paul Gittinger, and Ronald W. Stence It is certified that error appears in the above-identified patent and that said Letters Patent is hereby corrected as shown below:

In column 1, line 7, delete "(Attorney)";
        line 8, delete "Reference No: M-4636 U.S.)";
        line 12, delete "(Attorney Reference No: M-4638 U.S.)";
        line 16, delete "(Attorney Reference)".

In column 2, line 24, replace "mutliplexed" with --multiplexed--.

In claim 7, line 3, replace "sigial" with --signal--.

In claim 8, line 3, replace "programniable" with --programmable--.

In claim 11, line 2, replace "nunmber" with --number--.

In claim 21, line 3, replace "selector" with --select--.

Signed and Sealed this

Fourteenth Day of December, 1999

Attest:

Q. TODD DICKINSON

*Attesting Officer*     Acting Commissioner of Patents and Trademarks